RE 25,702
Oct. 10, 1961     C. P. DE BIASI     3,003,262
HYDRAULIC SYSTEM FOR DUMP TRUCKS
Filed Jan. 13, 1960     4 Sheets-Sheet 1
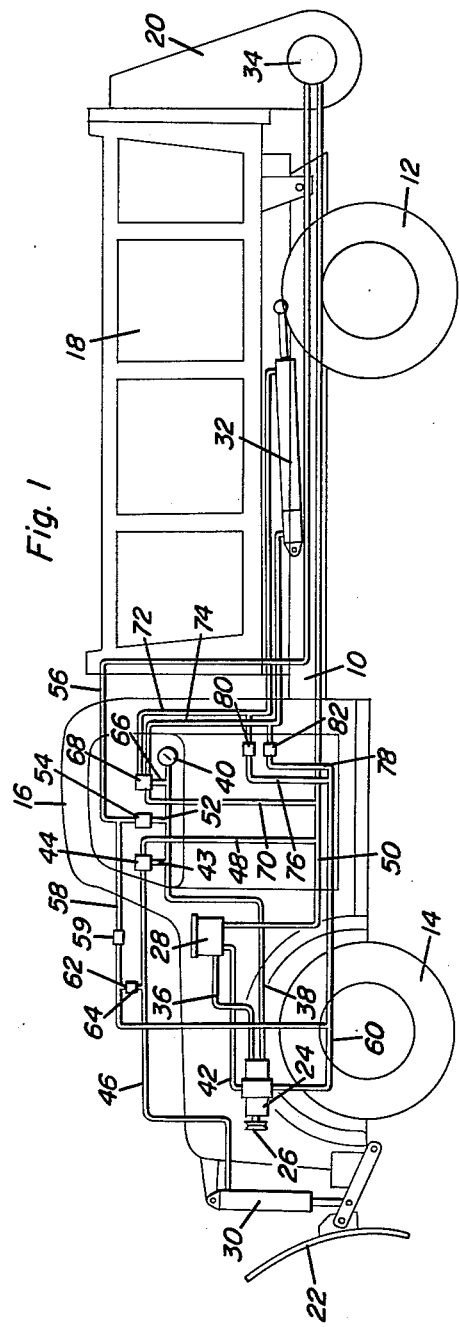
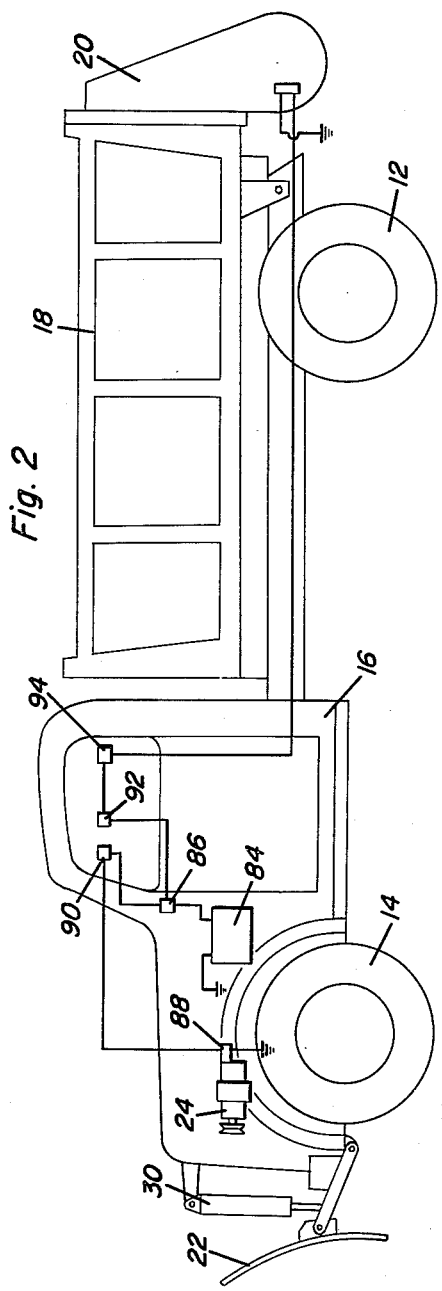
Charles P. DeBiasi
INVENTOR.
BY *Clarence A. O'Brien*
*and Harvey B. Jacobson*
Attorneys

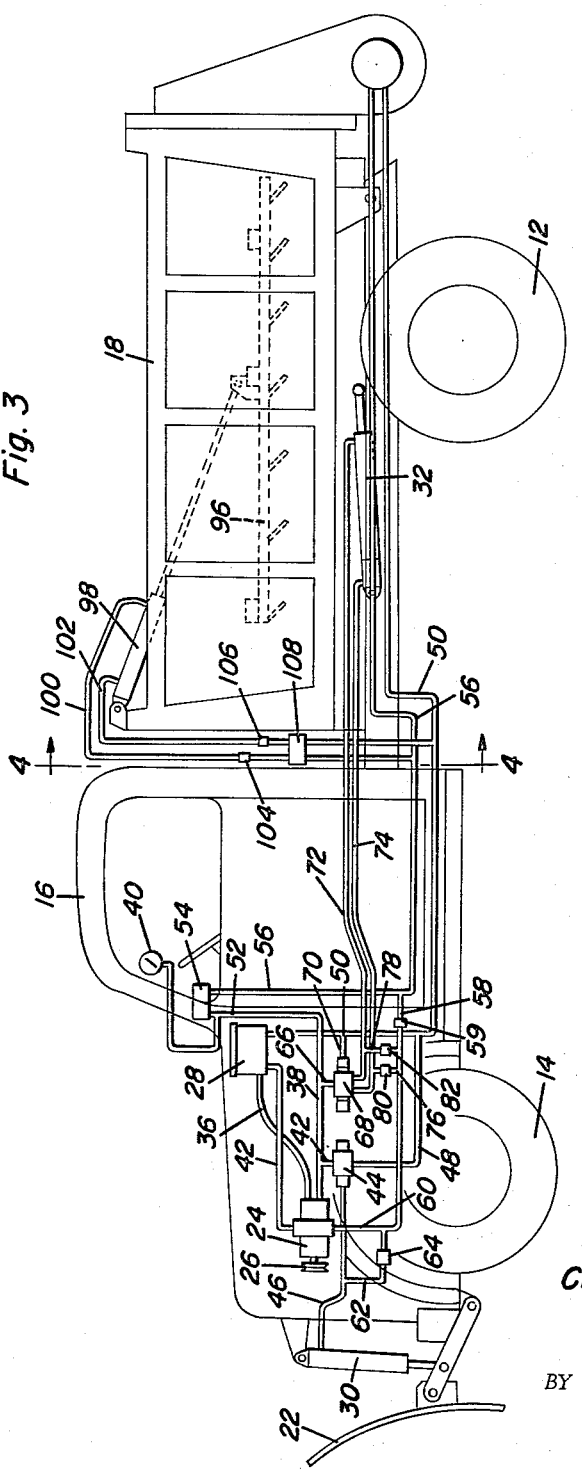

Oct. 10, 1961   C. P. DE BIASI   3,003,262
HYDRAULIC SYSTEM FOR DUMP TRUCKS
Filed Jan. 13, 1960   4 Sheets-Sheet 3

Charles P. DeBiasi
INVENTOR.
BY

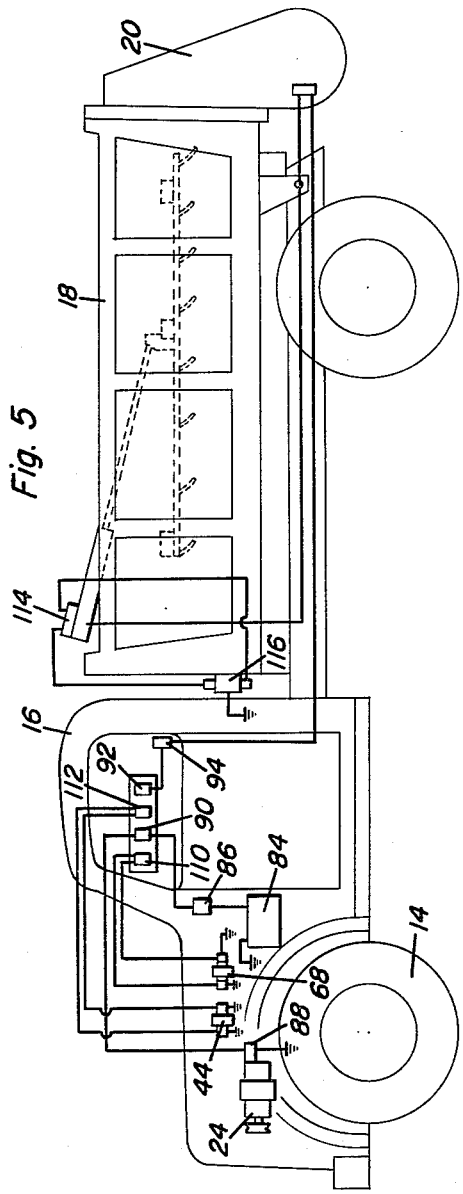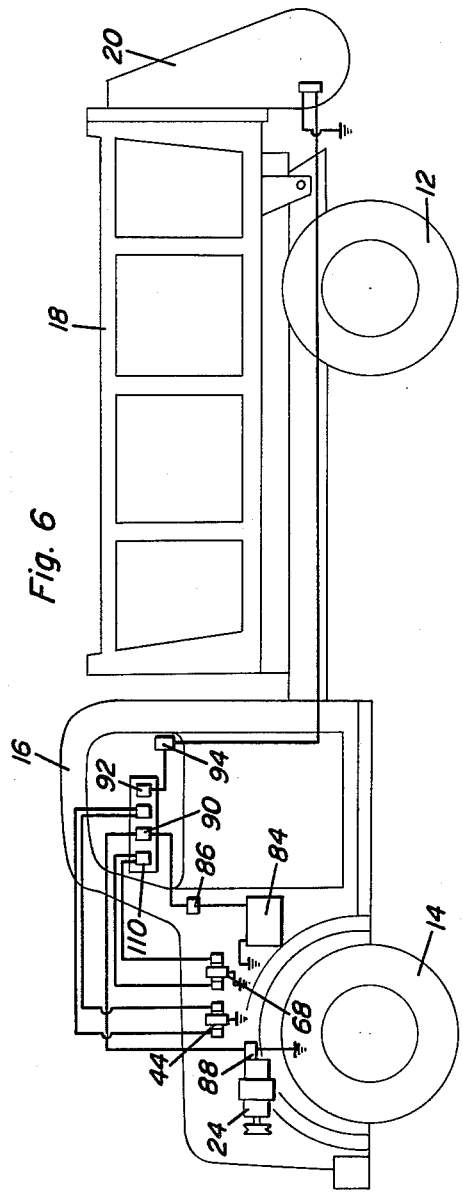

United States Patent Office 3,003,262
Patented Oct. 10, 1961

3,003,262
HYDRAULIC SYSTEM FOR DUMP TRUCKS
Charles P. de Biasi, 74 Braman Road, Waterford, Conn.
Filed Jan. 13, 1960, Ser. No. 2,240
8 Claims. (Cl. 37—41)

The present invention generally relates to novel structural arrangements and orientations in the control mechanism and drive mechanism for a dump truck type of vehicle and more particularly to novel orientations and arrangements in the hydraulic and electric systems for powering and controlling all of the attachments that may be employed on a dump truck.

Dump trucks are used for many purposes other than carrying loads such as has been disclosed in copending applications Serial Nos. 815,970 and 830,609 in which spreader assemblies are disclosed and also a feeding device for the spreader assembly and an automatic control mechanism is provided. Further, dump trucks may be provided with hydraulically controlled snow plows mounted on the front thereof and also, the load carrying body is provided with a hydraulically powered hoist. The present day practice in dump trucks of this nature is to provide a power take-off in the drive train or transmission for driving a hydraulic pump or pumps for controlling the position of the various driven elements. This requires considerable effort in repair of the unit and also when refilling the hydraulic system. Therefore, it is one object of the present invention to provide a hydraulic system in which a single pump is located under the hood and is driven by a suitable belt or the like from a crankshaft pulley which enables easy repair of the pump and refilling of the system, the pump being of a type having a variable discharge that is variable in response to the demand of the units being supplied by the pump.

Another object of the present invention is to provide a hydraulic system including a control panel in the cab of the truck located at a convenient place such as on the dashboard which panel would have controls for the dump body hoist, snow plow, spreaders and feeders.

A further important object of the present invention is to provide a dump body hoist that is fixed to the truck frame and the body whereby the body can be powered both upwardly and downwardly.

Another feature of the present invention is to provide a hydraulic and electric system for dump trucks which is simple in operation, easy to use, effective for its particular purposes and is generally inexpensive in its layout and installation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a schematic view of the hydraulic system of the present invention illustrating a dump truck in side elevation and including the dump truck hoist, a spreader on the rear of the dump truck body and a snow plow on the forward end of the dump truck;

FIGURE 2 is a schematic view of the electrical system employed in conjunction with the hydraulic system of FIGURE 1;

FIGURE 3 is a side elevational schematic view similar to FIGURE 1 but with the addition of a hydraulically controlled feeder for the spreader;

FIGURE 5 is a schematic view of the electrical system employed with the hydraulic system of FIGURE 3;

FIGURE 6 is a schematic electrical arrangement similar to FIGURE 5 but with the dump body spreader being fed by raising the dump body rather than the hydraulically operated feeder.

Figure 4:
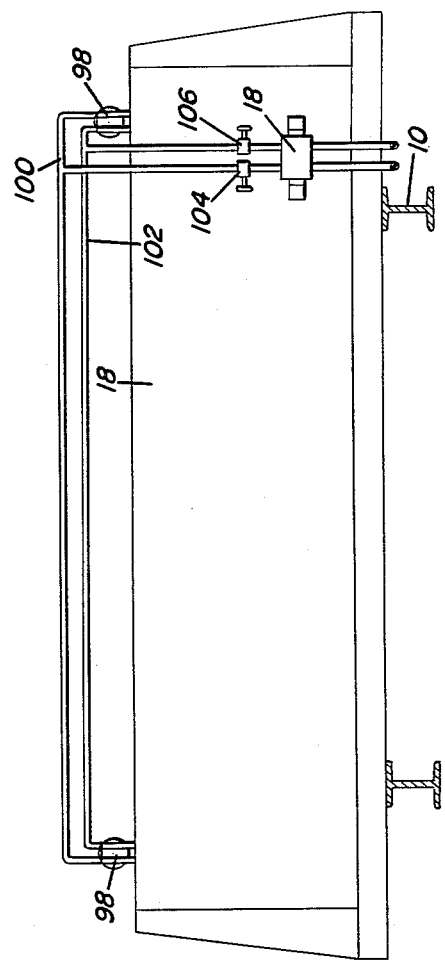
FIGURE 4 is a transverse, sectional view taken substantially upon a plane passing along section line 4—4 of FIGURE 3 illustrating the arrangement of the hydraulic lines for the pistons and cylinders which operate the feeder.

Referring now specifically to FIGURES 1 and 2 of the drawings, the hydraulic electrical control system for the dump truck is disclosed in which the dump truck is provided with a snow plow, a hoist for the dump body and a spreader with the dump body feeding the material into the spreader with the device being manually controlled.

The dump truck includes the usual frame 10, rear driving wheels 12, front wheels 14, cab 16 and dump body 18 having a spreader 20 mounted on the rear thereof. Supported from the forward portion of the frame is a snow plow 22 all of which are orientated in a manner well known with the spreader 20 being that shown in my prior pending applications.

The hydraulic system includes a pump 24 having a drive pulley 26 thereon for driving from a suitable V-belt arrangement and with the pump 24 being located under the hood of the cab of the truck with there also being provided a reservoir 28 under the hood of the truck whereby the pump may be repaired and the reservoir refilled with hydraulic fluid whenever desired with it only being necessary to elevate the hood.

The position of the snow plow 22 is controlled by a hydraulic piston and cylinder arrangement 30 and the dump body 18 is elevated by virtue of a hydraulic hoist 32 which is in the form of a piston and cylinder arrangement and the spreader 20 is powered by a hydraulic motor 34 all of which are powered from the single pump 24.

The hydraulic system includes an inlet line 36 extending from the reservoir 28 to the pump 24 and a high pressure discharge line 38 extending from the pump 24 and terminating within the cab 16 with there being a pressure gauge 40 thereon for indicating the pump pressure. The pump 24 is also provided with a bypass line 42 extending from the pump 24 to the reservoir 28.

Extending from the high pressure line 38 is a branch line 43 connected with a snow plow directional control valve 44 having a fluid line 46 connected therewith and extending to the snow plow piston and cylinder arrangement 30. The valve 44 is also connected to a return line 48 which in turn is connected with a low pressure return line 50 extending into the reservoir 28. A second branch line 52 extends from the high pressure line 38 and includes an orifice control valve 54 connected with a supply line 56 extending to the hydraulic motor 34 for controlling the rotational speed of the hydraulic motor 34 and the hydraulic motor 34 is connected with the low pressure return line 50 for return of the hydraulic fluid to the reservoir 28. A pressure control line 58 having a check valve 59 therein is provided from the orifice control valve 54 back to a pressure control or bypass line 60 to the pump 24. Also connected to this line is a cross over line 62 having a check valve 64 therein which connects the snow plow line 46 to the pressure control line 58 with the check valves 59 and 64 permitting flow in the direction from the snow plow line 46 and motor supply line 56 to the pressure control line 58.

A third pressure branch line 66 is connected to the high pressure line 38 and this line is provided with a hoist control valve 68 having a return line 70 connected with the low pressure return line 50 and having a pair of alternate pressure or return lines 72 and 74 connected therewith and which in turn are connected with the opposite ends of the hoist cylinder 32 for selectively admitting and exhausting pressure from the opposite ends of the hoist cylinder 32 whereby the hoist cylinder 32 will effectively be double acting.

The alternate pressure and return lines 72 and 74 also are connected to the pressure control line 60 by lines 76 and 78 respectively each of which has a check valve 80 and 82 respectively therein which permits flow in the direction from the lines 72 and 74 to the line 60.

FIGURE 2 illustrates the electrical circuitry in which the battery 84 is illustrated in the usual position as is the ignition switch 86. The ignition switch 86 supplies electrical energy to the pump solenoid 88 through a pump solenoid switch 90. Also, electrical energy is supplied to a single pole switch 92 in series with a buzzer 94 and the spreader for signalling the operator of the vehicle. Both the pump solenoid switch and the spreader switch are of the single pole type and of the on and off type which are manually controlled.

The pump employed in the present instances is a Sundstrand Hydraulic Division 32 PV series, variable displacement pump, with integral fixed orifice control. The integral control measures the pump output or motor demand and compensates itself by varying the pump wobbler angle in response to the pressure in the pressure bypass line 60. Thus, the variations of the truck engine r.p.m. does not affect the output of the pump. The pump also has a solenoid so that when no hydraulic power is desired the three way switch is energized to the solenoid on the pump which in turn places the pump wobbler normal to the pump pistons. Being an axial piston pump, no oil is pumped with the wobbler in this position. The three way switch is placed in series with the truck ignition switch so that there will be no chance of the battery being run down when the truck is not in use. The second leg of the three way switch is in a series with the spreader and feeder electrical system. The single pole switch is for the purpose of disconnecting the spreader feeder system when not in use and to turn off the buzzer when the driver is on his way for another load of material for spreading.

The double acting hydraulic hoist for the dump body will assure that the body may be lowered as well as raised since it is not unusual to see a dump truck body stuck in a raised position due to a counterbalancing weight such as a large stone that will not pass through the tailgate or because most of the material in the body is at the rear and the tailgate is stuck or jammed. This last mentioned condition is quite often aggravated when trucks are equipped with spreaders attached to the rear of the body adding to the unbalanced weight.

In FIGURE 3 of the drawings, the arrangement of components is substantially the same as that employed previously and the same reference numerals are used as in FIGURE 1. In this form of the invention, the dump body 18 is provided with a reciprocating feeder 96 powered by a pair of hydraulic piston and cylinder arrangements 98 of the double acting type each of which is provided with a pair of alternate pressure and return lines 100 and 102 which extend downwardly and are connected to the high pressure line 66 and low pressure return line 60 respectively with these two lines including cross overs to the two respective piston and cylinder arrangements 98 and each being provided with a needle valve 104 and 106 respectively and also being provided with a solenoid control valve 108 for the feeder. Other of the components are slightly reoriented in the schematic view of FIGURE 3 but retain the same functional relationship.

In the electrical circuitry illustrated in FIGURE 5, the same reference numerals for the same components are employed as in FIGURE 2 including the battery 84 and the pump solenoid switch 88. The ignition switch 86 supplies electrical energy to the several other switches including the spreader switch 92 and the buzzer signal 94 and also the pump solenoid switch 90. Also provided is a hoist switch 110 and a snow plow switch 112 which respectively control the snow plow valves and the hoist valves.

For automatic control, the feeder piston and cylinder arrangements are each provided with limit switches 114 which control operation of the feeder switch valve 116.

The electrical system in FIGURE 6 is the same as that in FIGURE 5 except that the feeder assembly in the switches and hydraulic system is not employed and the material is fed to the spreader by raising the dump truck body in the conventional manner.

In using the systems of the present invention, if the driver has a load of material with the spreader attached and he is ready to spread, the procedure would be as follows: He deenergizes the pump solenoid by use of the three way switch and simultaneously connects the electrical circuit to the spreaders and feeders. Also, the single pole switches must be connected. Now if the spreader switch demands material due to emptiness of the spreader as disclosed in my previous pending application, the solenoid four way valve will cause the feeder to operate until the spreader switch is satisfied. This operation will automatically repeat. Now the driver turns to the orifice control valve and sets it at any number he desires by using the control handle 118 illustrated in FIGURE 7 which has a pointer 120 thereon for association with one of a series of numerals 122 indicating the setting of the spreader depending on whether he wants to spread a large or small quantity of material per mile of road. It must be borne in mind that with this system the r.p.m. of all spreaders will be constant, depending only on the setting of the orifice control valve. All hydraulic motors are also axial piston types.

The buzzer has two functions in that it is essential when material is to be spread by dump body loading of the spreader such as by using hopper type spreaders and when using the spreader with the feeder it will notify the driver when body is empty and spreader switch cannot be satisfied. Should the driver desire to plow snow but has a spreader attached, he would disconnect the single pole switch so that he would not be annoyed by the buzzer, deenergize the pump solenoid and then control the snow plow by means of the snow plow orifice valve. Under this condition, the spreader and feeder would of course be out of operation. Should the driver desire to use the body dump hoist, he would again deenergize the pump solenoid, if no spreader is attached he can forget the single pole switch, and raise the body by the use of the four way manual valve. Should the body become stuck in raised position because of previously described reasons he can power it back to a level position.

Figure 7:
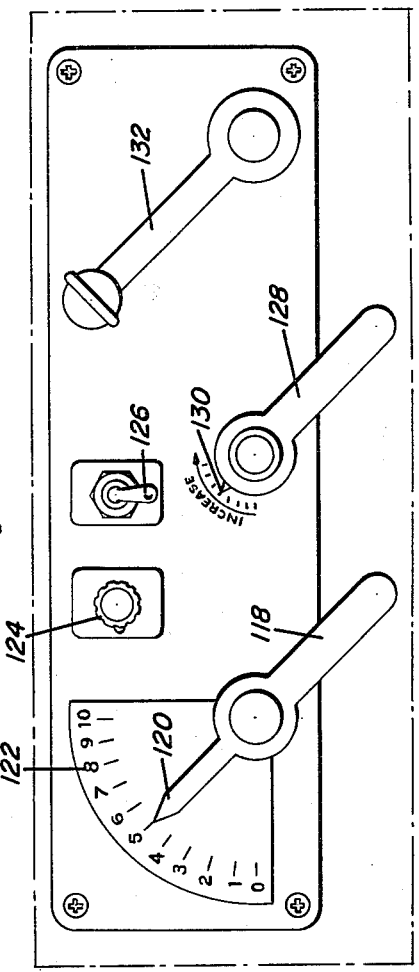
FIGURE 7 is a schematic plan view of the control panel for the hydraulic control system.

FIGURE 7 illustrates the orifice control valve handle 118 for controlling the spreader and feeder. Also, the three way switch for electrical control of pump solenoid and spreader is designated by the numeral 124 while the single pole switch to disconnect the spreader when desired is designated by the numeral 126. The directional control valve for the snow plow is designated by the numeral 128 which is a handle therefor together with a pointer 130 for controlling the position thereof. The four way hydraulic control valve for the dump hoist is provided with a handle 132 for operation thereof all of which is mounted in a control panel accessible to the driver of the vehicle.

While the orientation of the pump has been disclosed for exclusive powering from a crankshaft takeoff or other takeoff from a drive pulley on the forward end of the motor, it is pointed out that the pump could be orientated for a power takeoff from the rear end of the engine from the flywheel or from the transmission of the truck. The orientation of the pump may be varied to adapt it to installation in various trucks having various orientations of components under the hood and adjacent areas. For example, the pump could be located in other areas than under the hood since the pump will normally require very little servicing. Another example is the truck arrangements which have cab assemblies which pivot forwardly to provide access to the entire engine and drive train when desired. Thus, it is within the purview of the present invention to orientate the pump in any desired location and to power the pump from any suitable power takeoff from the engine or drive line for the truck.

The pump structure employed in the present invention is one presently commercially available from Sundstrand Hydraulic Division, of Rockford, Illinois. In the above mentioned pump, the line 42 is known as a drain line for the casing which drains fluid back to the reservoir. Also, all branch hydraulic circuits must have a line which feeds pressure back to the pump. Each of these lines is provided with a check valve to prevent this pressure from effecting other branch circuits. Thus, the lines 60, 62, 58, 76 and 78 are all pressure control lines. In this pump, a pressure drop across the remote line is reflected through the pressure control line back to the pump control and at a given orifice setting, the pump will maintain that flow regardless of the input speed of the pump.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A control system for dump body load carrying vehicles having a spreader mounted on the rear thereof and a snow plow mounted on the forward end thereof, hydraulic means interconnecting the snow plow and vehicle for varying the position of the snow plow, hydraulic means interconnecting the dump body and the vehicle for raising and lowering the dump body, and a hydraulic motor for operating said spreader, said control system comprising a single hydraulic pump mounted under the hood of the vehicle and having a variable output, a reservoir communicated with the pump and being located under the hood for ease of access when refilling the hydraulic system, a control valve communicating the fluid pressure discharge of the pump with the hydraulic means interconnecting the vehicle and the snow plow, a control valve communicating the pump discharge with the hydraulic means interconnecting the vehicle and dump body, and a control valve communicating the discharge of the pump with the hydraulic motor of the spreader, all of said control valves being located within the cab of the vehicle for access by the operator each of said control valves being provided with a pressure control line bypassing pressurized fluid back to the pump, said variable output means varying the output in response to the quantity of bypassed pressurized fluid back to the pump thereby providing for variation in the output of the pump in response to demand of the fluid motors operated thereby.

2. The combination as defined in claim 1 wherein said pump is provided with a solenoid controlling the discharge thereof, and a switch connecting the pump solenoid to a battery for controlling the output of the pump, said switch being disposed within the cab of the vehicle for control by the operator of the vehicle.

3. The combination as defined in claim 1 wherein said spreader motor control valve is provided with an adjustable orifice control for controlling the speed of the spreader.

4. The structure as defined in claim 1 wherein the dump body is also provided with a hydraulically reciprocated feeder for forcing the material rearwardly in the dump body, said feeder being communicated with the discharge of the pump and controlled by needle valves and a feeder switch valve for automatically operating the feeder at an adjustable rate when the spreader becomes empty.

5. The combination as defined in claim 4 together with a buzzer signal located in the cab of the vehicle for indicating to the operator of the vehicle that the load carrying body and the spreader are empty.

6. The combination of claim 5 wherein a switch is provided for the buzzer and spreader for permitting de-energization of the buzzer and spreader after emptying whereby the operator of the vehicle may return for another load without continuous operation of the buzzer.

7. A control assembly for dump bodies mounted on vehicles with the dump body having a spreader mounted on the rear thereof and the vehicle having a snow plow mounted on the forward end thereof, hydraulic pressure supply means mounted on the vehicle, hydraulic conduit means interconnecting the hydraulic supply means and the snow plow on the vehicle, hydraulic conduit means interconnecting the hydraulic supply means and the spreader for powering the spreader, a directional control valve in the hydraulic conduit means interconnecting the supply means and snow plow, an orifice control valve in the hydraulic conduit means interconnecting the supply means and the spreader, a pressure control line interconnecting the conduit means remote from the control valve and the supply means, said supply means including means responsive to flow of fluid through the pressure control line for varying the output of the supply means in response to the demand of the snow plow and spreader.

8. In a hydraulic control system for a load carrying vehicle having a hydraulically powered spreader at one end thereof, a variable output pump, a pressure supply line interconnecting the pump and the spreader motor, a control valve in the pressure line, and a pressure control valve interconnecting the pump and the pressure line at a point remote from the control valve, said pump including means varying the output thereof in response to the volume of flow of fluid through the pressure control valve thereby providing a pressure supply adequate to satisfy the demand of the hydraulically operated spreader.

References Cited in the file of this patent

UNITED STATES PATENTS

| | | |
|---|---|---|
| 2,599,840 | Keele et al. | June 10, 1952 |
| 2,697,609 | Chase et al. | Dec. 21, 1954 |
| 2,700,397 | Compton | Jan. 25, 1955 |
| 2,738,196 | Underwood | Mar. 13, 1956 |
| 2,799,510 | Schmidt | July 16, 1957 |